United States Patent [19]

haberman

[11] Patent Number: 4,973,816

[45] Date of Patent: Nov. 27, 1990

[54] PLASMA TORCH WITH SAFETY SWITCH

[75] Inventor: Randy G. Haberman, Burbank, Calif.

[73] Assignee: Delaware Capital Formation, Inc., Burbank, Calif.

[21] Appl. No.: 329,732

[22] Filed: Mar. 28, 1989

[51] Int. Cl.$^5$ .................................................. B23K 9/00
[52] U.S. Cl. ........................... 219/121.48; 219/121.51; 219/121.54; 219/75
[58] Field of Search ........... 219/121.48, 121.3, 121.51, 219/121.52, 121.54, 121.57, 74, 75, 130.4; 313/231.21, 231.31

[56] References Cited

U.S. PATENT DOCUMENTS

| | | | |
|---|---|---|---|
| 4,580,032 | 4/1986 | Carkhoff | 219/121.57 |
| 4,585,921 | 4/1986 | Wilkins et al. | 219/121.5 |
| 4,590,354 | 5/1986 | Mashic et al. | 219/121.48 |
| 4,691,094 | 9/1987 | Hatch et al. | 219/121.52 |
| 4,692,582 | 9/1987 | Marhic | 219/121.57 |
| 4,701,590 | 10/1987 | Hatch | 219/121.54 |
| 4,767,908 | 8/1988 | Dallavalle et al. | 219/121.5 |
| 4,791,268 | 12/1988 | Sanders et al. | 219/121.57 |

Primary Examiner—M. H. Paschall
Attorney, Agent, or Firm—Jessup, Beecher & Slehofer

[57] ABSTRACT

A plasma torch is provided with a safety switch which is connected in a circuit so as to control high voltage applied to the torch. The switch is held closed by the torch tip. When the tip is removed, as for service or replacement, the switch opens and disables the high voltage, so that personnel cannot accidentally be shocked.

9 Claims, 2 Drawing Sheets

PLASMA TORCH WITH SAFETY SWITCH

This invention relates to a plasma cutting or welding torch and more particularly to a safety switch which disables the arc current when the tip of the torch is removed.

A typical plasma torch consists of a handle which is bent at an angle at the end to form a torch head. The head terminates in a tip or nozzle having an orifice through which a plasma arc is expelled. Adjacent the tip, in the interior of the body is an electrode to which one side of the arc current supply is connected. The tip erodes relatively rapidly and must be replaced from time to time during the life of the torch. When the tip is removed, as for tip and/or electrode maintenance, the electrode is exposed. When properly used, the welding circuit is open circuited and the welding voltage is removed. However, if the welding circuit is accidentally closed, the exposed electrode presents a significant electrical voltage hazard to the operator.

SUMMARY OF THE INVENTION

In accordance with the present invention, a safety switch is incorporated in the interior of the torch head and is positioned so that the switch is held closed when the tip is in place in the torch head, and is automatically opened when the tip is removed. This removes high voltage from the head.

BRIEF DESCRIPTION OF THE DRAWINGS

A preferred embodiment of the torch and safety switch of the present invention is shown in the figures, wherein:

FIG. 1.

DETAILED DESCRIPTION OF THE DRAWINGS

Figure 1:
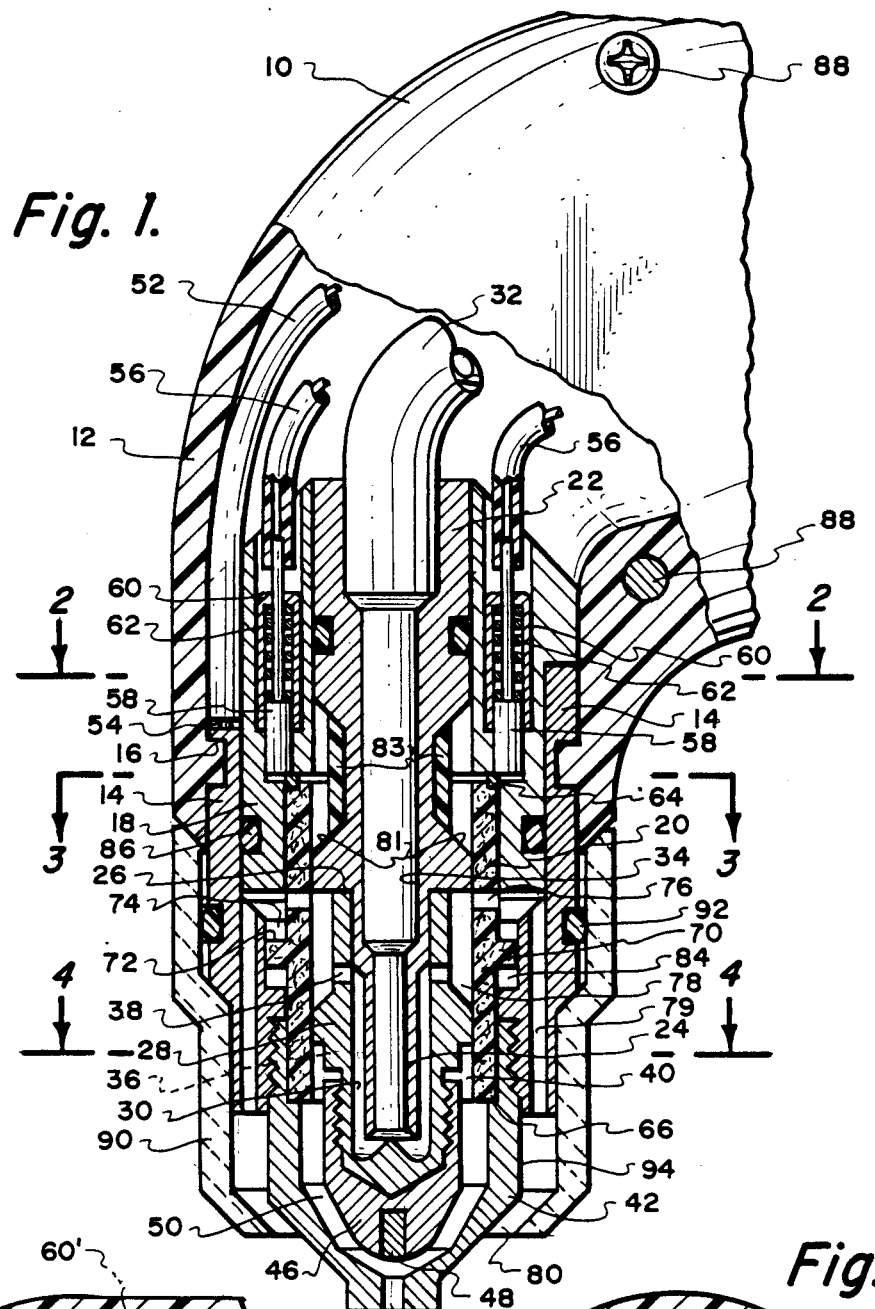
FIG. 1 is a longitudinal section of the torch head showing a portion of the handle.

Referring to the drawings, 10 represents a torch handle made of suitable insulating material. It is curved at one end and terminates in a torch head 12. Secured within the head 12 is a sleeve 14 made of a suitable conducting material such as brass. The securement is by means of a circular groove-and-ridge joint, shown at 16. Within the sleeve 14 is an insulating cylinder 18 made of a suitable material such as phenolic resin. Within the cylinder 18 there is mounted, for longitudinal sliding, a cylindrical member 20 made of suitable low friction insulating material such as a fluoro elastomer, e.g. Teflon. In the center of the head 12 is mounted a cylindrical body 22 made for example of brass. The member 20 slides in the annular space between the members 18 and 22. The body 22 is ensmalled at its end and terminates in a tube 24. Bonded at 26 to the body 22 is a nose 28, which surrounds the tube 22, leaving an annular passage 30 between the tube 24 and the nose 28. Extending into the interior of the handle is a conduit or tube 32 made for example of copper which communicates with an axial passage 34 in the center of the body 22 and tube 24. Plasma gas or other suitable fluid, as for example ambient air under pressure, flows into the tube 32, down the passage 34, and into the annular space 30. The flow then divides into two branches, one represented by a series of radial ports 36 in the nose 28—the other represented by a series of radial ports 38 also in the nose 28 and axially spaced from the ports 36. The ports 36 emerge or exit into an annular passage 40 formed between the slideable cylinder 20 and the nose 28.

The end of the sleeve 14 is interiorly threaded and receives, by screwing in, a torch tip 42 made of suitable material such as copper. The tip has an orifice 44 from which the plasma arc emerges. To the end of the nose 28 is threaded an electrode 46 made for example of copper, which has an insert 48 at its axial tip end, made for example of hafnium or zirconium. Plasma fluid, such as ambient air, flows in from the tube 32, into the passage 34, annulus 30, radial ports 36, annulus 40, and thence into the annular space 50 between the interior of the tip 42 and the exterior of the electrode 46. It then emerges as a plasma jet through the orifice 44.

Arc current is supplied through the conducting tube 32 in the handle 10, which is connected to the body 22. Arc current flows from the conductor 32 into the nose 28, thence into the electrode 46. It then arcs over to the work piece (not shown), where, in conjunction with the air jet, it forms an arc plasma jet, emerging from the orifice 44, for use in cutting and welding.

The plasma torch disclosed herein is of the pilot arc start type, in which a high frequency voltage is applied between the tube 32 and a conductor 52, connected at 54 to the sleeve 14. This creates an arc between electrode 46 and tip 42. Thereafter after the arc is sustained by the DC arc voltage fed in thru the conductor 32, which maintains the arc between the electrode 46 and the work piece. Control of the high frequency starting current applied to the head 12 involves a pair of leads 56, which terminate in respective contacts 58 mounted in the insulator 18. Each contact 58 is slideably mounted in a cartridge 60, secured in respective longitudinal bores in the insulator 18. Within each cartridge 60 is a compression spring 62 which biases the respective contact 58 outward.

The slideable cylinder 20 has a conductive ring 64 which encircles and is bonded to the upper edge of the cylinder 20 and is held in contact with the two contacts 58 diametrically spaced across the ring 64.

The cylinder 20 carrying the ring 64, in conjunction with the diametric contacts 58, serves as a safety switch, by means of which it is assured that the high potential voltage is cut off from the head 12 whenever the tip 42 is removed, as for example for replacement. To this end the tip 42 is provided with an interior shoulder or ledge 66 against which the bottom edge of the cylinder 20 bears. When the tip 42 is in installed position, as shown in FIG. 1, the cylinder 20 is pushed upward, so that the ring 64 is held in electrical contact with the two spring-biased contacts 58.

In the embodiment shown, the switch represented by the elements 20, 64, and 58 is incorporated into a circuit which controls current to the high voltage circuits in the head 12.

To assure that the cylinder 20 will drop down and open the switch when the tip 42 is removed, a biasing force is provided which biases the cylinder 20 downward and thus biases the switch open, as shown at 68. In the preferred embodiment, this biasing is provided by a secondary branch of the air or other fluid. To this end the cylinder 20 is provided with an outer flange 70 which in effect constitutes a piston bearing against the inner wall of the sleeve 14, which thus constitutes a cylinder for the piston. The upper face 72 of the ridge 70 faces an annular chamber 74 formed between the inner wall of sleeve or cylinder 14 and the outer wall of the cylinder member 20. Air is supplied to this annular chamber 74 through a series of radial ports 76 passing through the wall of the cylinder 20 and communicating with the annular space 78 between the inner wall of the cylinder 20 and the outer surface of the nose 28. Air is supplied to this, second, branch of the fluid passage from the radial ports 38 which communicate with the annular space 30. This second branch of air flow emerges from the bottom of the tube 24, and flows up the annulus 30. A portion of it branches through the radial ports 36 and becomes the plasma jet. A second portion continues up in the annulus 30, goes radially outward through the ports 38, and into the annulus 78. From there the air flows through the radial ports 76 into the annular chamber 74 and exerts pressure on the face 72 of the ridge or piston portion 70. The air then flows downward through a series of longitudinal passages 79 and emerges to atmosphere at 80 around the nozzle portion of the tip 42, where it serves as a cooling medium for the tip.

To minimize danger of arcing between the switch 58/64 and the body 22, the body 22 is relieved by a peripheral groove 81. Additional insulation in the form of a sleeve 83 may be provided if needed.

Figures 4, 5:
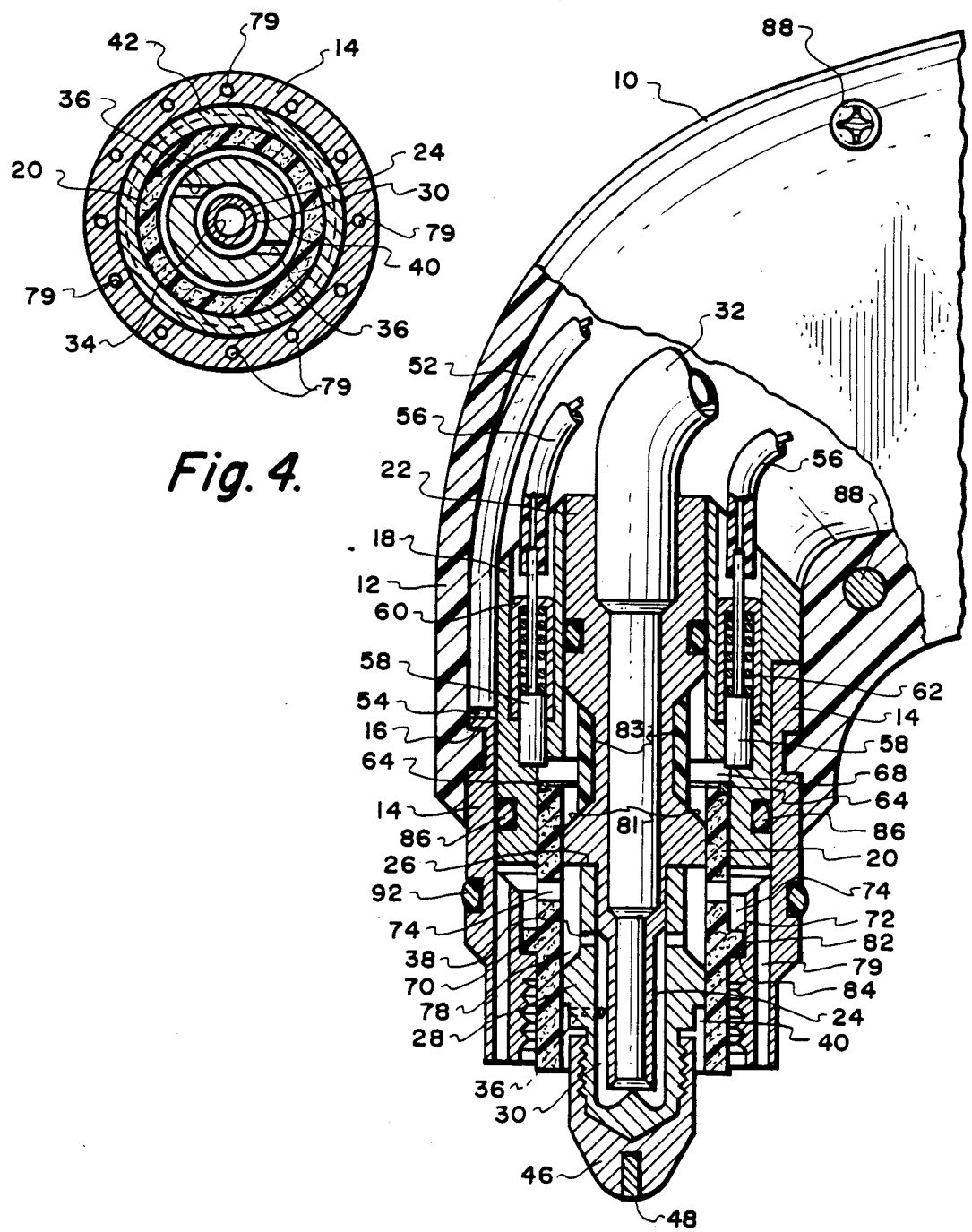
FIG. 4 is a cross section taken of line 4—4 of FIG. 1.
FIG. 5 is a longitudinal section similar to FIG. 1 showing the parts in the position they assume when the welding tip has been removed.

When the tip 42 is unscrewed from the torch head 12, as shown in FIG. 5, the air pressure in the annular chamber 74 forces the cylinder 20 downward to the position shown in FIG. 5 and opens the switch at 68. This de-energizes the high frequency starting circuit, which also de-energizes the main arc welding circuit, removing all voltage from the torch head 12.

The tolerances between the outer periphery 82 of the piston ridge 70 and the adjacent inner wall of the sleeve 14 are such that no significant amount of air is trapped in the lower annular chamber 84 located beneath the piston ridge 70, and there is no significant inhibition to the reciprocation of the cylinder 20, because of the creation of any pressure or vacuum the chamber 84.

Figure 2:
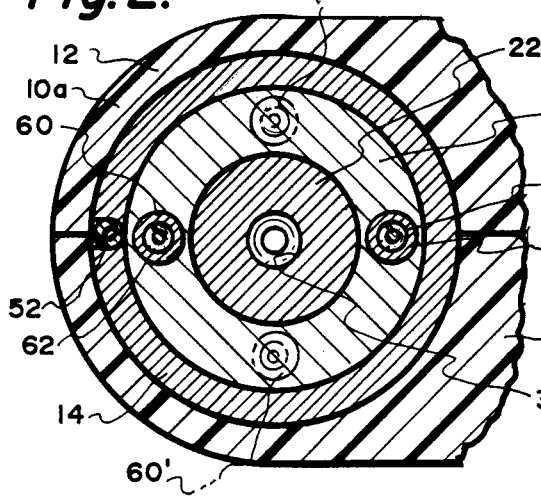
FIG. 2 is a cross section taken on line 2—2 in FIG. 1.
Figure 3:
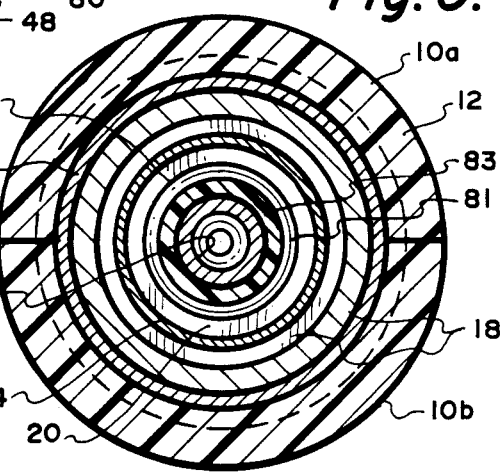
FIG. 3 is a cross section taken on line 3—3 of FIG. 1.

The torch head is assembled in the following manner. The cylinder 20, constituting the operable piston for the biasing of the switch, is first installed in the phenolic insulator 18. The assembly is then pressed into the sleeve 14. An 0 ring 86 provides a seal between the members 18 and 14. The brass body 22 is then inserted in the center of the assembly and the outcover or handle 10 is installed in place. The handle 10 is a 2-piece clam shell arrangement, as shown by the two portions 10a and 10b in FIGS. 2 and 3. They are held together by fasteners shown at 88.

The body including the brass nose 28 bonded thereto is inserted down the center of the assembly.

The electrode 46 is screwed on to the nose 28 and the tip 42 is screwed into the threaded socket formed in the conducting ceramic sleeve 14. Finally, there is a gas cup 90 made of a suitable such as alumina is pressed into place around the sleeve 14, being held in place frictionally by an 0 ring 92.

In the preferred embodiment, the tip is removed with the aid of knurling at 94. The electrode 46 is provided with flats for a wrench.

OPERATION

In normal use the torch head parts are in the position shown in FIG. 1. Plasma air is applied through the tube 32. A control circuit for the starting current and the arc current includes, in series, the switch represented by the elements 58 and 64, to which the leads 56 are connected. Energizing of the control circuit turns on the starting and the arc current. This forms an ionizing arc between the electrode 46 and the tip 42. At substantially the same time DC arc voltage is applied to the conducting lead 32 and a plasma arc is effected between the electrode 46 and the work piece (not shown). Thereafter the high frequency starting voltage is removed and the plasma torch operation proceeds.

When the tip 42 is to be removed for examination repair or replacement, the gas cup 90 is pulled off and the tip 42 is unscrewed, leaving the parts in the position shown in FIG. 5. If the electric circuits have been inadvertently left on, there would be dangerously high voltage at the head 12. However, because of the pressure in the annular chamber 74, the cylinder/piston 20 is biased downward, opening the switch 64/58, and disabling both the high frequency starting circuit and the DC arc circuit. There is thus no potential in the torch head 12 to endanger personnel.

In FIGS. 1 and 5 the axis connecting the two contact cartridge 60 has been shown, for convenience, as paralleling the direction of the handle 10. In the actual structure, it is preferred to orient these diametrically disposed cartridges 60, ninety degrees from the position shown in FIG. 2, as shown in dotted lines at 60'. This gives more space for conducting the leads 56 away from the assembly and into the handle portion 10.

What is claimed is:
1. Plasma torch safety switch, comprising:
means for supplying arc voltage to the torch;
means for supplying starting current to the torch;
means for energizing said arc voltage supplying means in response to energization of said starting current supplying means;
switch means for disconnecting flow of said starting current to the torch;
removable torch tip means for maintaining said switch means closed, when said tip means is installed in the torch;
biasing means independent of said tip means for biasing said switch means toward disconnect position;
whereby said switch means is actuated to a disconnect position by said biasing means when said tip means is removed from the torch.
2. Plasma torch safety switch, comprising:
switch means for disconnecting flow of current to the torch;
removable torch tip means for maintaining said switch means closed, when said tip means is installed in the torch;
air pressure actuated biasing means independent of said tip means for biasing said switch means toward disconnect position;
whereby said switch means is actuated to a disconnect position by said biasing means when said tip means is removed from the torch.
3. Switch in accordance with claim 2, wherein
said air pressure actuated means comprises cylinder means;
piston means slideable in said cylinder means; and means for supplying air to said cylinder means to effectuate sliding between said piston means and said cylinder means.

4. Plasma torch safety switch, comprising:
 switch means for disconnecting flow of current to the torch;
 removable torch tip means for maintaining said switch means closed, when said tip means is installed in the torch;
 air pressure actuated biasing means for biasing said switch means toward disconnect position;
 said air pressure actuated means comprising:
 cylinder means;
 piston means slidable in said cylinder means; and
 means for supplying air to said cylinder means to effectuate sliding between said piston means and said cylinder means;
 said piston means having an electrically conductive switch element forming a portion of said switch means and including
 a pair of spaced switch contacts forming a portion of said switch means and bridged by said switch element when said tip is installed in the torch, thereby to enable flow of current to the torch;
 removal of said tip means allowing said piston means to be moved by said air pressure to open said switch means and disable flow of current to the torch.

5. Plasma torch safety switch, comprising:
 a central body;
 a cylindrical member mounted for longitudinal sliding over said body;
 one end of said cylindrical member being provided with a conductive ring;
 a pair of spaced contacts mounted to said body and aligned longitudinally with said ring;
 conductive leads electrically connected to said contacts, respectively;
 said cylindrical member being slidable to bring said ring into contact with said contacts to close a circuit between said leads;
 biasing means for biasing said cylindrical member away from said contacts;
 a removable torch tip mounted to said body and bearing against the other end of said cylindrical member to hold said ring in contact with said contacts;
 removal of said tip enabling said biasing means to slide said cylindrical member away from said contacts, and open said circuit between said leads.

6. Plasma torch comprising:
 a body having removably mounted therein a tip with an orifice, and arc means associated therewith for emitting a plasma arc jet thru said orifice;
 passage means adapted to be connected to a fluid source for creating the plasma arc jet;
 said passage means having a first branch terminating at said orifice, and a second branch for providing a biasing force for a switch means;
 switch means including contact means mounted to said body and adapted to be connected to a source of voltage, and piston means having at least a portion movably mounted in said body having a switch member secured thereto,
 said tip, when mounted in said body bearing against said piston means and maintaining said switch member in contact with said contact means;
 said second branch leading to a chamber adjacent a face of said piston means and biasing said piston means away from said contact means so as to open said switch means;
 whereby upon removal of said tip, pressure of said fluid moves said piston means to open said switch means.

7. Plasma torch in accordance with claim 6 wherein:
 said piston means comprises a cylinder aligned with said orifice and a cylindrical member slidebly mounted in said cylinder and having an annular shoulder;
 a face of said shoulder being contiguous to said chamber;
 whereby said tip, when mounted in the torch, serves to hold said cylindrical member in position to maintain said switch means closed,
 removal of said tip allowing fluid pressure in said chamber to move said cylindrical member away from said contact means and open said switch means.

8. Switch is accordance with claim 7 wherein:
 said switch means comprising;
 contact means, and
 a movable switch member;
 said tip bearing against said switch member when said tip is installed in the torch, to maintain said switch member in electrical contact with said contact means;

9. Switch in accordance with claim 8, including biasing means for biasing said switch member away from said contact means, thereby to bias said switch means to open circuit position.

* * * * *